United States Patent [19]

Fraley

[11] Patent Number: 4,993,160
[45] Date of Patent: Feb. 19, 1991

[54] PIPE ALIGNMENT DEVICE AND METHOD

[76] Inventor: Glenn W. Fraley, 6372 Trenton-Franklin Rd., Middletown, Ohio 45042

[21] Appl. No.: 418,118

[22] Filed: Oct. 6, 1989

[51] Int. Cl.$^5$ .............................................. G01C 5/02
[52] U.S. Cl. ........................................ 33/286; 33/293
[58] Field of Search ................ 33/286, 1 H, 293–296, 33/DIG. 21

[56] References Cited

U.S. PATENT DOCUMENTS

| | | | |
|---|---|---|---|
| 2,470,487 | 5/1949 | Hollis | 93/55.1 |
| 3,116,557 | 1/1964 | Trice, Jr. | 33/46 |
| 3,314,068 | 4/1967 | Verive | 343/107 |
| 3,580,211 | 5/1971 | Kurashiki | 33/286 |
| 3,591,926 | 7/1971 | Trice, Jr. | 33/1 H |
| 3,599,336 | 8/1971 | Walsh | 33/46 |
| 3,612,700 | 10/1971 | Nelson | 33/286 |
| 3,619,069 | 11/1971 | Alexander | 33/286 |
| 3,631,601 | 1/1972 | McNulty | 33/46 |
| 3,633,813 | 12/1972 | Looney | 228/44 |
| 3,827,155 | 8/1974 | Menzel | 33/286 |
| 3,907,435 | 9/1972 | Roodvoets | 356/153 |
| 4,060,909 | 12/1977 | Collines | 33/296 |
| 4,310,281 | 1/1982 | Egashira | 33/286 |
| 4,681,439 | 6/1987 | Shoemaker | 33/286 |
| 4,796,362 | 1/1989 | Shoemaker | 33/1 H |

Primary Examiner—William A. Cuchlinski, Jr.
Assistant Examiner—William C. Dowling
Attorney, Agent, or Firm—Frost & Jacobs

[57] ABSTRACT

There is provided a device for aligning and preliminarily supporting conduit and pipe along a predetermined rectilinear axis, with such device including a base member, an upstanding standard attached adjacent its lower end to the base, and a jack sleeve adjustably attached to the standard. A locking device is preferably provided to selectively attach the jack sleeve relative the standard as desired, and an alignment bar attached to the jack sleeve extends outwardly therefrom to support a length of conduit or pipe to aligned along the rectilinear axis. An alignment target is provided for monitoring the proper alignment of the alignment bar and the conduit or pipe supported thereon along the predetermined rectilinear axis.

25 Claims, 5 Drawing Sheets

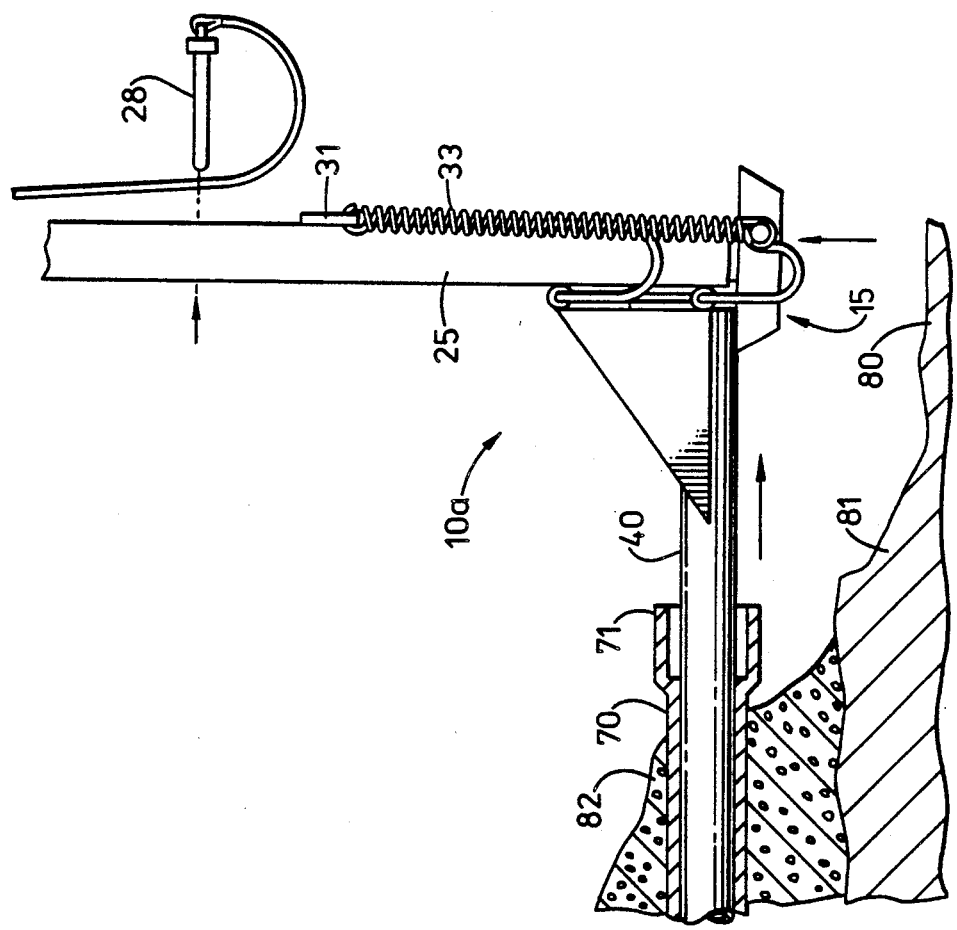
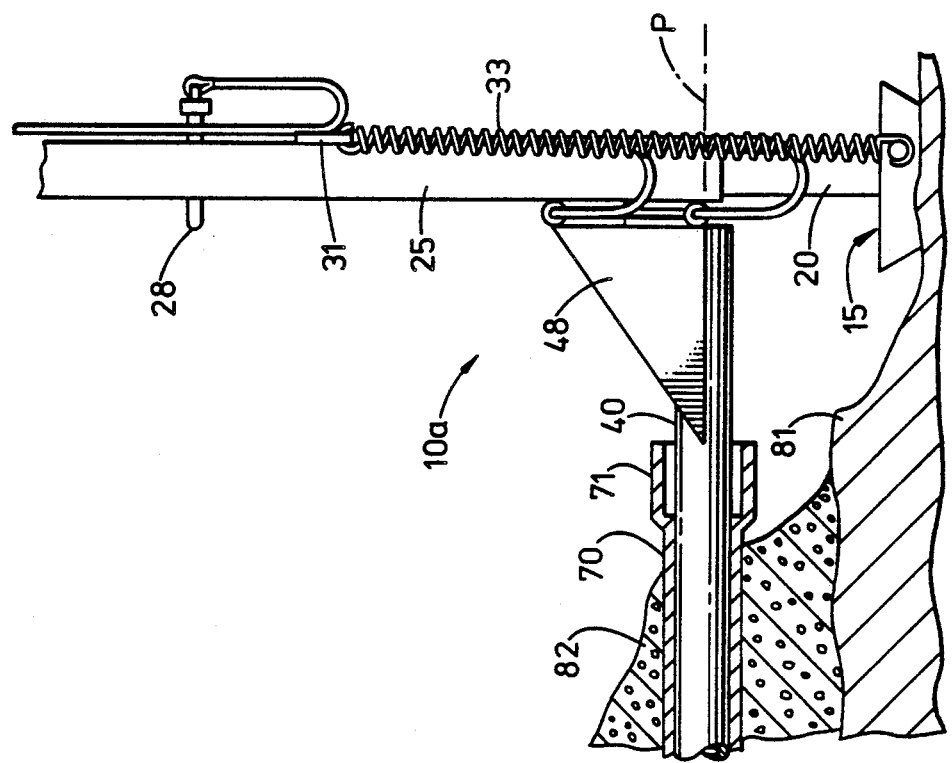
FIG. 4
FIG. 3

PIPE ALIGNMENT DEVICE AND METHOD

TECHNICAL FIELD

This invention relates to a method and means for aligning sections of pipe along a selected grade, and, more particularly, to a device and method for aligning and preliminarily supporting tubular conduit or pipe along a predetermined rectilinear axis to simplify and facilitate pipe laying operations.

BACKGROUND ART

The setting or laying of conduits and pipeline on a selected grade line has traditionally involved a generally slow and relatively complicated procedure. In particular, customarily, a survey is completed for the conduit or pipe system whereby, for example with regard to sewer pipe, manholes are marked off every 350 to 400 feet. Traditional procedures also dictate that batterboards then be set at distances of approximately 25 to 50 foot intervals, and a chalk line is strung across the batterboards to establish a line of reference along which the pipe is to be layed. The batterboards are set at such a height that a line passing through the batterboard sights will be above the highest point of the terrain between two adjacent manholes.

The distance between the flow line of the conduit or pipe to be layed and the chalk line reference is thereafter determined to fix the grade. This procedure requires a crew including a pipesetter and an operator of a gauging pole which extends from the line of reference to the top of a section of pipe being layed. The gauge pole must be kept in vertical alignment to properly gauge the grade. Computations are made by the pipesetter depending upon information relayed to him by the gauge pole operator, and the fine grading for the setting of the pipe is done manually by placing gravel and/or dirt under the pipe where the trench has been cut too deep, and by removing soil or gravel from beneath the pipe where the trench is not deep enough. This system is obviously subject to relatively wide fluctuations in accuracy of the finished pipe flow line depending upon the skill and attention of the crew. This method also has obvious limitations on the amount of conduit or pipe which can be layed in a given time period.

A variety of methods and devices have been utilized in the prior art to attempt to improve on the batterboard-chalk line method of fixing grades and laying pipe. For example, in U.S. Pat. No. 3,116,557, which issued Jan. 7, 1964 to J. Trice, Jr., a lightbeam is used as the line of reference for laying sewer pipe, and a projector is placed at the manhole site for passing a lightbeam through the pipe to be layed. A target carrier is attached at the distal end of the section of pipe being layed, and a pair of handles is provided to assist the worker in moving the pipe during alignment procedures. The light is sent through the pipe at an angle determined by the use of standard optical equipment such as a transit and prism located above the manhole. The target carrier fits over the end of the pipe being layed and an operator sets the grade by reference to the position at which the light strikes the target. The Trice method and apparatus is relatively complex and inconvenient in use, and has proven to be insufficiently accurate to ensure reliable results.

In U.S. Pat. No. 3,314,068, which issued to A. Verive on Apr. 11, 1967, a grading method is shown as utilizing a signal producing device which transmits a signal to a receiving device mounted on a gauge pole placed along the flow line of a pipe being layed. While the Verive method and apparatus attempted to reduce the cost of pipe aligning devices and to increase the efficiency of the operation, it relied upon manual alignment of the pipe with fine grading done by hand. For fine grinding, gravel and/or dirt would be pulled under the pipe where the trench was too deep, or the pipe was lifted and additional soil removed where the bottom of the trench was high. A related method for laying pipe is shown in U.S. Pat. No. 3,631,601, which issued to L. McNulty on Jan. 4, 1972. The McNulty reference requires mounting of a laser beam projector in the first pipe section which has been preset along the desired pipeline and grade by conventional surveying techniques. Alignment of subsequent lengths of pipe is accomplished by the same manual methods, with reference to a laser beam target mounted in the pipe section to be aligned. Similar laser beam alignment targets and methods for aligning pipes with laser beams are set forth in U.S. Pat. Nos. 3,907,435 and 3,599,336.

While these attempts to improve upon the tedious and time consuming conventional techniques utilizing batterboards set on line by use of a transit have had varying degrees of success, each relies on a substantial amount of manual labor to align the pipe and to properly set the grade thereof. Additionally, none of the methods and devices heretofore available provide preliminary support for the length of conduit being aligned during initial backfilling procedures. Each of these previously available methods and devices also require a relatively substantial amount of training for operators and laborers utilizing the systems, which can substantially add to the inefficiencies and costs involved in pipelaying operations where labor force turnover rates are relatively high.

Consequently, while there have been a variety of prior art attempts to improve on the conventional methodology utilized to fix grades and set conduit and pipe, heretofore there has not been a tool adapted for aligning and preliminarily supporting a length of pipe to be layed, which is simple in construction and operation, inexpensive, and reliably accurate in use.

DISCLOSURE OF THE INVENTION

It is an object of this invention to obviate the above-described problems and shortcomings of the methods and apparatuses heretofore available in the industry for aligning and laying pipe and conduit.

It is another object of the present invention to provide an improved method and apparatus for aligning and preliminarily supporting tubular conduit and pipe along a predetermined rectilinear axis.

It is yet another object of the present invention to provide a pipe alignment and grading tool which is relatively simple in design and operation, inexpensive, and easy to use for aligning and supporting tubular conduit and pipe along a predetermined grade.

It is also an object of the present invention to provide a device for aligning and supporting pipe and conduit to be aligned, and which can be operated with minimal instruction and experience.

It is yet another object of the present invention to provide a device for aligning and preliminarily supporting conduit and pipe which can be easily collapsed and/or disassembled for shipment or storage.

In accordance with one aspect of the present invention, there is provided a device for aligning and preliminarily supporting tubular conduit and pipe along a predetermined rectilinear axis, with such device including a base member, an upstanding standard attached adjacent its lower end to the base, and a jack sleeve adjustably attached to the standard. A locking device is preferably provided to selectively attach the jack sleeve to the standard as desired, and an alignment bar attached to the jack sleeve extends outwardly therefrom to support a length of conduit or pipe to be aligned along the rectilinear axis. An alignment target is provided for monitoring the proper alignment of the alignment bar and the conduit or pipe supported thereon along the predetermined rectilinear axis.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

FIG. 3 is an enlarged, partial side view of a pipe alignment device made in accordance herewith as it would be utilized to align and support a section of pipe during laying procedures;

FIG. 4 is an enlarged, partial side view illustrating removal of the pipe alignment device from a previously aligned section of pipe as shown in FIG. 3;

DETAILED DESCRIPTION OF THE INVENTION

Figure 1:
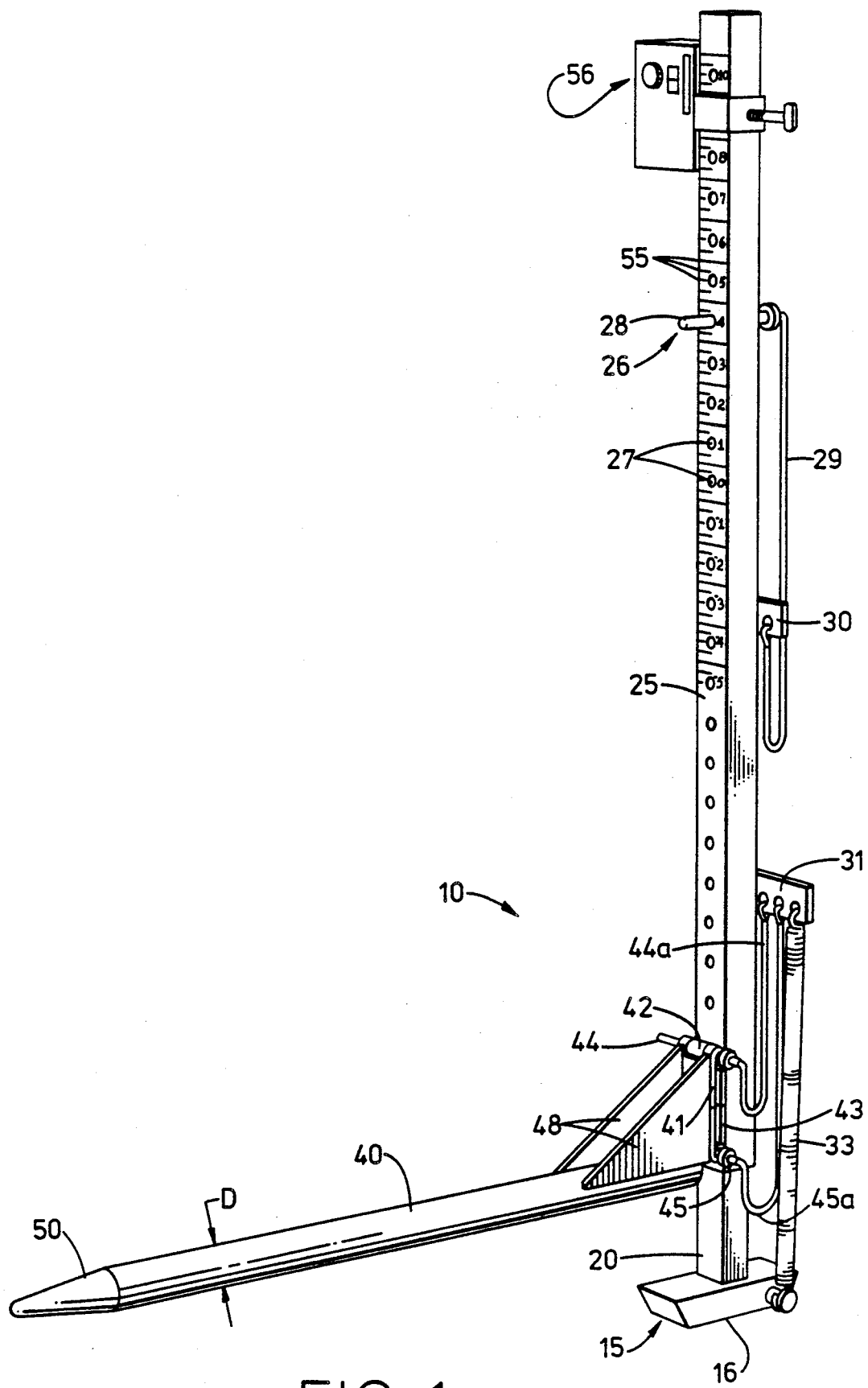
FIG. 1 is a perspective view of a preferred embodiment of a pipe alignment device made in accordance with subject invention.

Referring now to the drawings in detail, wherein like numerals indicate the same elements throughout the views, FIG. 1 illustrates a preferred embodiment of a pipe aligning device 10 of the present invention. Aligning device 10 comprises a base member 15 having a lower surface or foot 16 for supporting the pipe aligning device 10 on the upper surface of an open trench into which conduit or pipe is to be layed, as will be described in more detail below. Surmounting base 15 and extending upwardly therefrom is upright standard 20 designed for slidable interaction with jack sleeve 25.

FIG. 1 illustrates a preferred arrangement wherein jack sleeve 25 is telescopingly arranged as a slidable sleeve member over upright standard 20 such that sleeve 25 can be adjustably located relative standard 20 at a variety of vertical positions. While the sleeve-like telescoping arrangement is not critical, it is preferred as providing a relatively strong and durable adjustable combination. Other sliding connections such as tongue and groove arrangements or similar channel and rail interlocking devices could equally be utilized.

Means are also preferably provided for selectively locking jack sleeve 25 in a desired position relative upright standard 20. FIG. 1 illustrates jack sleeve 25 as including a plurality of spaced holes 27 passing through oppositely disposed front and rear surfaces thereof through which a locking pin 28 is passed to provide attachment means 26. It is contemplated that upright standard 20 can also be formed with a plurality of spaced holes corresponding to holes 27 through which pin 28 may be passed, or pin 28 can be passed through a set of holes 27 adjacent to and above the uppermost surface of upright standard 20 such that pin 28 would rest on the upper surface of standard 20 to effectively support jack sleeve 25 in a desired vertical position. Pin retainer chain 29 is illustrated as connecting locking pin 28 to an anchor bracket 30 simply to ensure that locking pin 28 remains available for use at all times, and is not lost or misplaced in use or during transit or storage.

Cantilevered outwardly from the lower portions of jack sleeve 25 is pipe alignment bar 40. Alignment bar 40 is provided to support a length of conduit or pipe to be aligned, and preferably is formed with a diameter D slightly undersized relative the inside diameter of the conduit or pipe to permit bar 40 to be nicely received therewithin. Although the length of alignment bar 40 may vary between applications, it is preferred that bar 40 be designed to effectively support a length of conduit or pipe along substantially the entire length of the conductor pipe, especially where lightweight items such as flexible plastic pipe is being layed. With heavier and/or more rigid pipe, this requirement is much less of a concern.

Pipe alignment bar 40 is illustrated as being attached in a substantially perpendicular orientation relative jack sleeve 25 via a pair of spaced bar supports 48 which are in turn attached to a hinged mounting bracket 41. In particular, mounting bracket 41 is illustrated as being hingedly attached by a pair of vertically spaced upper and lower hinge pin mounts 42 and 43, respectively.

Upper hinge pin mount 42 includes hinge pin 44, while lower hinge pin mount 43 includes hinge pin 45. Similar to the arrangement described above with regard to locking pin 28, hinge pins 44 and 45 are preferably captively secured to aligning device 10 via retaining chains such as illustrated at 44a and 45a, respectively. It should be noted that by removing hinge pin 45, pipe alignment bar 40 can be hingedly rotated upwardly to a position substantially parallel and adjacent to jack sleeve 25 for more compact storage and/or transit. Further, removal of both hinge pins 44 and 45 allows the disassembly of alignment bar 40 from jack sleeve 25 for replacement by a pipe alignment bar of different diameter, or for transit or storage. In this regard, it is contemplated that pipe aligning device 10 can be utilized with various pipe alignment bars 40 having different diameters D for use with correspondingly sized conduits or pipes to be aligned and layed. By designing each pipe alignment bar with a standard mounting bracket arrangement, the operator need only choose the pipe alignment bar of proper diameter for the conduit or pipe to be aligned, and thereafter attach the selected alignment bar 40 via the hinge pin mounts 42 and 43, respectively.

At the distal end of pipe alignment bar 40, a conical support bar tip or insertion cone 50 is preferably provided to facilitate insertion of alignment bar 40 into a length of conduit or pipe to be aligned. While the peripheral shape of insertion cone 50 and alignment bar 40 is not particularly critical to the subject invention, it is preferred that these structures have a substantially round conformation to correspond with the inner surfaces of most pipe and conduit.

It is also preferred that an upward bias be provided between jack sleeve 25 and base 15. As illustrated in FIG. 1, a means for biasing base 15 and its attached upright standard 20 relative jack sleeve 25 is provided via spring member 33, which is attached at its upper end to the lower support bracket 31. Biasing means 33 is provided to generally urge foot 15 and standard 20 in an upward direction relative jack sleeve 25 to facilitate removal of pipe aligning device 10 from a previously aligned section of conduit or pipe, as will be described in greater detail below. Other means for biasing base 15 in an upward direction relative jack sleeve 25 can equally be provided by one of ordinary skill in the art, and the spring arrangement is merely illustrated as a simple and reliable means of accomplishing this result.

Jack sleeve 25 may also be provided with a reference scale or calibration markings (e.g. 55) for use with standard transit or similar optical elevation grading equipment, and can also be provided with a target (e.g. 56)for use with laser elevation grading equipment. Laser target or receiver 56 is shown as being adjustably attached to sleeve 25 via a standard clamp arrangement. Such a receiver can include a visual and/or audible indicator for monitoring whether the site being checked is high, low, or on-grade, such as provided by the "Level-Eye" TM available from Spectra-Physics of Dayton, Ohio.

Figure 2:
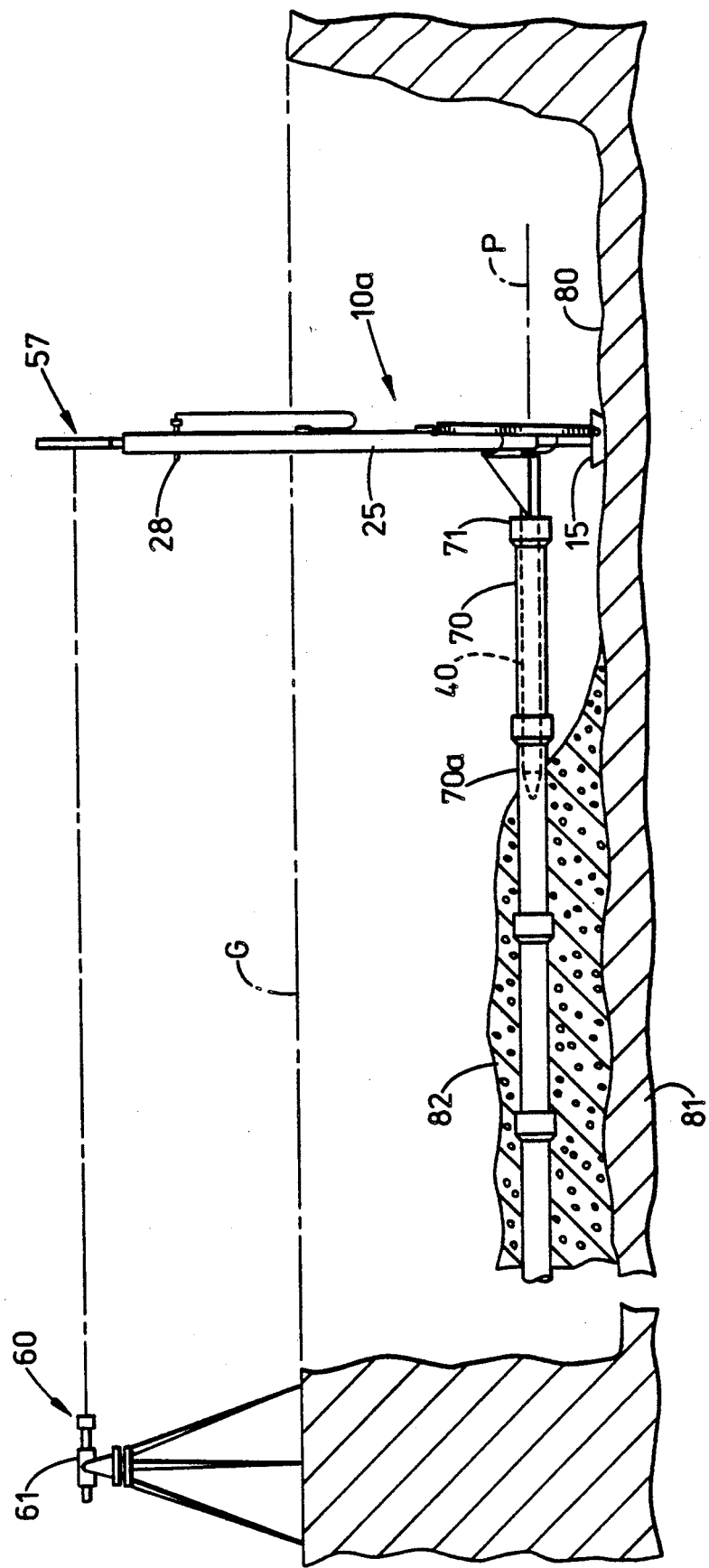
FIG. 2 is a vertical cross-sectional view of a pipeline trench illustrating the use of a pipe alignment device made in accordance with the subject invention, with such pipe alignment device being utilized with standard optical alignment equipment.

FIG. 2 is a vertical cross-sectional view of a typical pipeline trench, and illustrates a pipe aligning device 10a of the subject invention being used with standard optical alignment equipment 60 (e.g. transit 61). Pipe aligning device 10a is essentially identical to aligning device 10 shown in FIG. 1, except that laser target 56 has been replaced by a calibration extension or gauge pole 57 which can be extended from the upper portions of jack sleeve 25 to provide sufficient calibration markings (e.g. 55) for monitoring the proper pipe grade with transit 61.

It should be understood that the pipeline trench would be opened by appropriate equipment and/or machinery to provide an upper trench surface 80 corresponding to the desired pipeline P along which conduit or pipe is to be layed. As illustrated in FIG. 2, pipe aligning device 10a is utilized to align and preliminarily support successive pipe sections (e.g. 70a and 70) along pipeline or pipe center P. In particular, a section of pipe 70 is placed on pipe alignment bar 40 (preferably with its female end 71 oriented toward jack sleeve 25 and with its male end located adjacent the distal end of alignment bar 40). Once the male end of the new pipe section 70 to be aligned is inserted into the female end of a previously layed pipe section (e.g. section 70a), base 15 is placed on the upper trench surface 80 and jack sleeve 25 is moved vertically relative upright standard 20 until the operator verifies that pipe section 70 is properly aligned along pipeline P. The operator generally works with the transit operator to verify when the proper grade level is obtained, then inserts pin 28 to lock jack sleeve 25 in the desired vertical orientation.

FIG. 2 illustrates alignment device 10a as it would appear following the described vertical adjustment of sleeve 25 and after locking pin 28 has been inserted. At this point, aligning device 10a provides support for the aligned pipe section 70 while backfilling procedures are completed. Support during preliminary backfilling operations is very important in assuring that the conduit or pipe remains aligned along the desired pipeline P, especially in applications where relatively lightweight conduit or pipe (e.g plastic drain pipe) is being placed. In addition to more accurate positioning, the added support during preliminary backfilling helps to ensure the safety and maintenance of proper connections between successive lengths of pipe. Once the pipe section 70 is properly backfilled in a manner indicated for the previous pipe section 70a, aligning device 10a can be removed from pipe section 70 to prepare for aligning a subsequent pipe section.

FIG. 3 illustrates an enlarged partial view of pipe aligning device 10a as it would appear after preliminary backfilling operations had been completed with regard to pipe section 70. As illustrated, pipe section 70 is still supported along the desired pipeline P, and has been substantially secured in place by backfilling procedures.

It has been found that it may be preferred for alignment bar 40 to have a length sufficient to extend partially into previous pipe section 70a (as illustrated in FIG. 2), especially for lightweight drain pipe and the like, to provide support for the exposed end of pipe 70a during preliminary backfilling for subsequent pipe section 70. Lightweight aluminum or alloy materials can be used to form alignment bar 40 in order to minimize the weight and to facilitate handling of an alignment device made in accordance herewith.

FIG. 4 illustrates the procedure for removing pipe aligning device 10a from the previously aligned and backfilled pipe section 70. In particular, the operator merely removes locking pin 28 from jack sleeve 25, which allows biasing means 33 to pull base 15 and standard 20 upwardly within the square elongated tube of jack sleeve 25. Once base 15 has been lifted from above trench surface 80, withdrawal of pipe alignment bar 40 from the aligned pipe section 70 can more easily be accomplished. Once withdrawn from the previously aligned section of conduit or pipe, aligning device 10a is ready to align and support a subsequent length of pipe. The operator then places the next length of pipe onto pipe alignment bar 40, inserts the male end of the new length of pipe into the female end 71 of the previously aligned pipe 70, and is ready for aligning procedures.

In use, it is contemplated that the operator of aligning device 10a would secure base 15 on trench surface 80, such as by placing his foot on base 15, while raising jack sleeve 25 until the pipe to be aligned was properly oriented along the desired pipeline P, as identified by transit 61 or similar grade indicating device. When the proper vertical orientation of jack sleeve 25 relative to standard 20 has been obtained, locking pin 28 is inserted to maintain alignment bar 40 in that vertical position.

It should be understood that to ensure proper orientation, aligning device 10a must be oriented substantially vertically such that a true reading of the calibration or scale 55 can be obtained through transit 61. It should also be understood that FIG. 2 includes the use of a conventional transit 61 and calibration/scale 55 (with extension 57) only as an example, and other alignment optics 60 such as a laser beam/target arrangement or the like can equally be substituted. Obviously, if a laser beam source (e.g. a rotating laser beam generator) were utilized instead of transit 61, a laser beam target (e.g. receiver 56 of FIG. 1) would be substituted for the calibration scale 55 and its extension or gauge pole 57.

Figure 5:
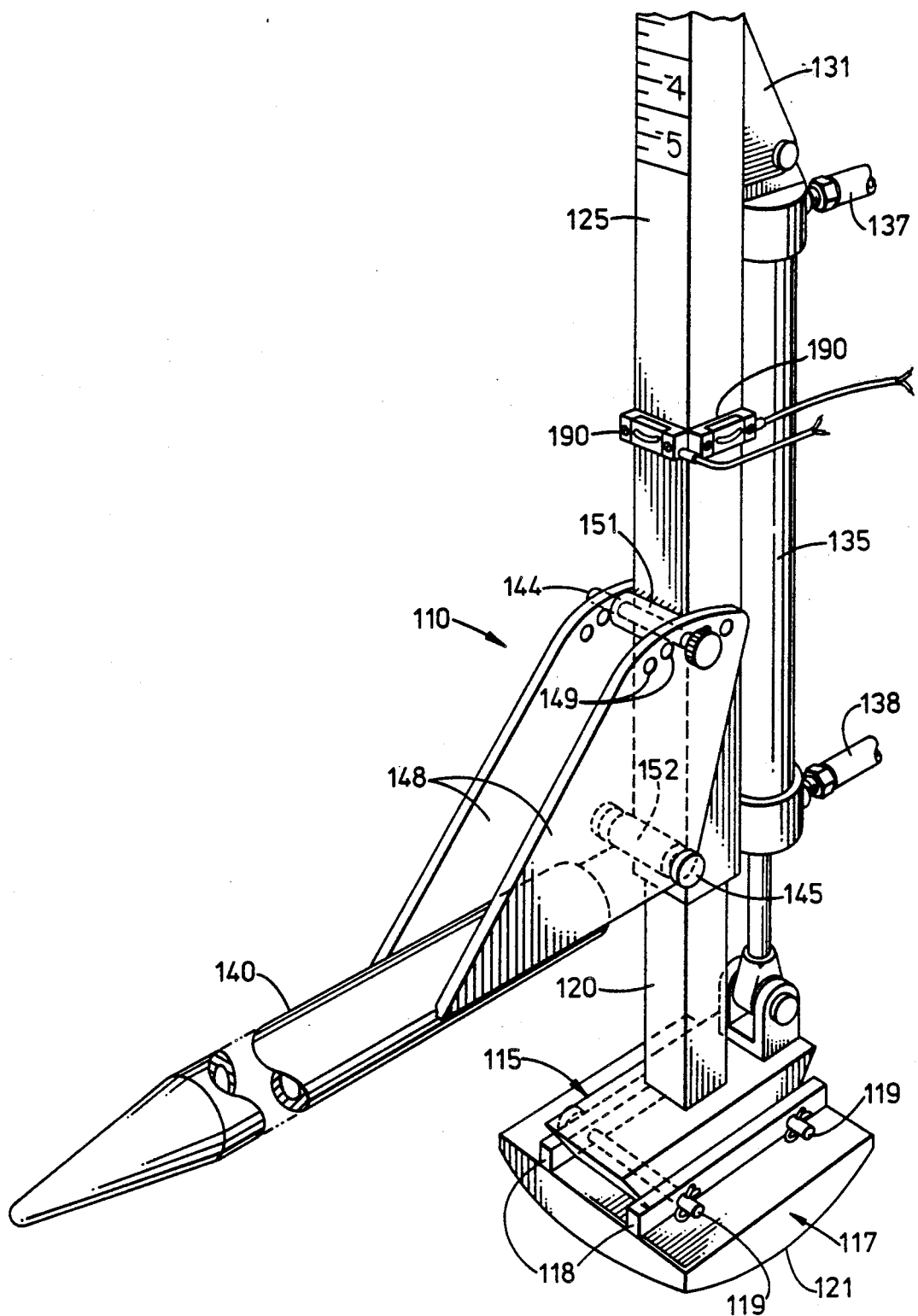
FIG. 5 is a partial, perspective view of an alternate embodiment of a pipe alignment device made in accordance with the subject invention, illustrating an alignment assist mechanism which can be part of the apparatus.
Figure 6:
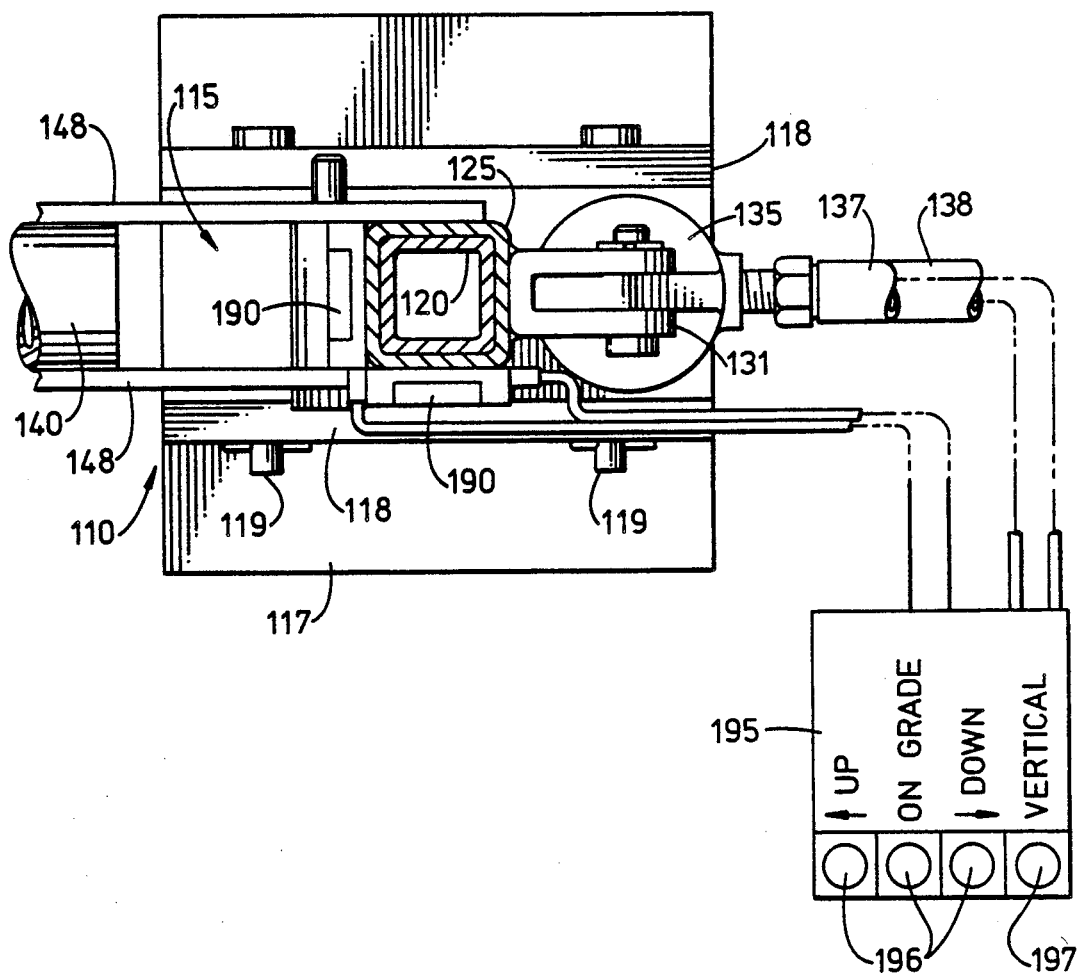
FIG. 6 is a top plan view of the pipe alignment device shown in FIG. 5.

FIGS. 5 and 6 illustrate an alternate embodiment of a pipe aligning device 110 made in accordance with the subject invention, wherein a vertical adjustment assisting mechanism (e.g. hydraulic or pneumatic cylinder 135) can be provided to facilitate the vertical adjustment of jack sleeve 125 relative upright standard 120. In particular, it is contemplated that for heavier sections of conduit or pipe, vertical adjustment assisting mechanisms may be preferred. One or more assisting devices such as the hydraulic or pneumatic cylinder 135 illustrated in FIGS. 5 and 6 may also provide enhanced sensitivity and/or precision to the vertical adjustment of jack sleeve 125 relative standard 120 and base 115. It is contemplated that pipe aligning device 110 could be used with or without the attachment or locking means including the spaced holes and locking pin (e.g. holes 27 and locking pin 28 as described with regard to FIG. 1), as the vertical assist mechanisms may serve to provide this locking function.

Because aligning device 110 is contemplated for use with heavier pipe and conduit sections, it may also be desirable to provide an auxiliary foot 117 having increased surface area to provide better support for the aligning device in use. As illustrated, it is contemplated that auxiliary foot 117 could be designed for selective attachment directly to base 115 by a pair of pin connectors 119 passing through a pair of spaced parallel connection ribs 118 and the lower portions of base 115. As illustrated, auxiliary foot 117 might also be formed with a rounded lower surface (e.g. 120) to facilitate leveling operations and vertical alignment of device 110 in use.

As seen best in FIG. 6, it is further contemplated that a control unit 195 could be utilized for controlling the operation of one or more vertical adjustment assisting devices such as the cylinder 135 illustrated. In this regard, control 195 could be directly tied into a laser receiving target (e.g. as shown at 56 in FIG. 1), whereby alignment errors could be directly fed from the target to control 195 for automatically determining adjustments necessary in pipe aligning device 110. Level indicators 190 are illustrated for use in monitoring the vertical orientation of sleeve 125, and could also be directly connected to control 195 to indicate when aligning device 110 was properly vertically oriented. Alternatively, level indicators 190 could most simply comprise a pair of bubble levels appropriately fixed on sleeve 125 to indicate the vertical alignment in two perpendicular planes.

It is contemplated that once pipe aligning device 110 is properly vertically oriented, input received from the laser target could be processed by control 195 for automatically determining and implementing necessary vertical adjustment of sleeve 125 relative to standard 120 and base 115. Once all alignment was properly completed, a signal (e.g. a visual or audible signal) could be given for backfill operations to begin. Following preliminary backfill operations, aligning device 110 could be removed from the aligned section of pipe by lifting base 115 and withdrawing device 110 from the pipe. It is contemplated that control 195 could include various indicator lamps (e.g. 197) to indicate when proper vertical alignment of device 110 is achieved relative the laser beam light source, as well as when proper vertical orientation of pipe alignment bar 140 had been achieved prior to backfilling operations (e.g. lamps 196 indicating "on grade" or adjustment "up" or "down" necessary).

While FIG. 6 illustrates a preferred arrangement wherein jack sleeve 125 comprises a square elongated tube member telescopingly arranged over an upright standard 120 of similar square cross-section, as set forth above, these structures need not be in telescoping arrangement, nor do they need to be necessarily of rectangular cross-section.

Because a vertical assist member (e.g. cylinder 135) can equally function to extend or retract base 115 relative the lower end of jack sleeve 125 (i.e. a double action cylinder), a biasing member as described above is not required in this embodiment. It should also be understood that if alignment device 110 is utilized with standard leveling/grading equipment such as a transit, the operator would simply verify that aligning device 110 was vertically oriented by checking level indicators 190, and thereafter operate the vertical assist device such as cylinder 135 to properly vertically adjust alignment bar 140 as indicated by the transit on calibration markings (not shown) of sleeve member 125, as described above with regard to FIG. 2. A similar procedure would also be employed if a laser and laser target alignment arrangement were utilized in place of the transit/calibration marks. Moreover, while the embodiment of FIGS. 5 and 6 has been described as potentially substantially automatic in completing the alignment procedures, the degree of automation is, of course, dependent upon the intended application and preference of the owner of the equipment. It is generally preferred that the pipe aligning device of the present invention remain as simple in construction and operation as possible, and the automation features described herein may be appropriate only for the most sophisticated applications.

FIG. 5 also illustrates alignment bar supports 148 having a plurality of pairs of aligned hinge pin holes 149. It is contemplated that these pairs of hinge pin holes 149 can provide adjustable attachment of alignment bar 140 relative to jack sleeve 125 such that the angular orientation of alignment bar 140 can be locked in one of a plurality of preset configurations. While it is generally preferred to attach alignment bar 140 in a substantially perpendicular orientation relative jack sleeve 125, there may be times when it might be advantageous to have the ability to lock alignment bar 140 in a preset angular orientation relative jack sleeve 125 to provide a predetermined grade angle along alignment bar 140 corresponding to the grade line of a desired pipeline P.

Hinge pin holes 149 can be formed so as to provide a plurality of preset angular orientations in addition to the horizontal orientation of alignment bar 140 relative sleeve 125, and can be set as desired by simply removing hinge pin 145 and replacing it in the hinge pin holes 149 corresponding to the desired angle of orientation. It should be noted that to permit angular adjustment of bar 140, a pin attachment cylinder 151 on sleeve 125 is provided in place of the mounting bracket (e.g. 41) shown and described with regard to the embodiment of FIG. 1. The exact number and location of the hinge pin holes 149 would, of course, depend upon the length of alignment bar 140 and the standard percentages of change desired in typical grade lines. It is contemplated that the non-normal angles of orientation of alignment bar 140 relative sleeve 125 would normally be very small (e.g. between 1 and 5 degrees), and that the general orientation of alignment bar 140 would remain substantially perpendicular to jack sleeve 125.

Having shown and described the preferred embodiments of the present invention, further adaptions of the pipe aligning device and method described herein can be accomplished by appropriate modifications by one of ordinary skill in the art without departing from the scope of the present invention. Several of the potential modifications have been mentioned, and others will be apparent to those skilled in the art. For example, while illustrated and described as a method and apparatus for aligning and supporting pipes for subterranean systems, it is contemplated that the present invention could equally be adapted for alignment and placement of above-ground systems as well. Accordingly, the scope of the present invention should be considered in terms of the following claims and is understood not to be limited to the details of structure and operation shown and described in the specification and drawings.

I claim:

1. A device for aligning and preliminarily supporting hollow conduit and pipe along a predetermined rectilinear axis, said device comprising:
   a base;
   a standard attached adjacent its lower and to said base and extending upwardly therefrom;
   a jack sleeve adjustably mounted relative said standard;
   means for selectively adjusting the position of said jack sleeve relative said standard, as desired;
   an alignment bar attached to said jack sleeve and extending outwardly therefrom to support a length of conduit or pipe to be aligned along said rectilinear axis; and
   means for monitoring the proper alignment of said alignment bar along said rectilinear axis comprising vertical reference means provided on said jack sleeve for use with elevation grading equipment to monitor the grade of a supported hollow conduit or pipe.

2. The device claim 1, wherein said jack sleeve is telescopingly mounted relative said standard for sliding movement to permit adjustment of the position of said sleeve relative said standard.

3. The device of claim 1, wherein said means for selectively adjusting the position of said jack sleeve relative to said standard comprises a plurality of holes formed in said jack sleeve and a locking pin designed to fit within one or more of said holes to effectively fix said jack sleeve in a particular position relative said standard.

4. The device of claim 1, wherein said alignment bar has a predetermined size and shape so designed to fit within a length of conduit or pipe to be aligned and to support said conduit or pipe along substantially its entire length during alignment and backfilling procedures.

5. The device of claim 1, wherein said alignment bar has a predetermined length substantially equal to said length of conduit or pipe to be aligned.

6. The device of claim 1, further comprising means for mechanically assisting the adjustment of the position of said jack sleeve relative said standard.

7. A device for aligning and preliminarily supporting hollow conduit and pipe along a predetermined rectilinear axis, said device comprising:
   a base;
   an upstanding standard attached adjacent its lower end to said base;
   a jack sleeve slidably mounted on said standard;
   means for selectively positioning said jack sleeve relative said standard and base, as desired;
   an alignment bar attached to said jack sleeve and extending outwardly therefrom in a substantially perpendicular orientation to support a length of conduit or pipe to be aligned along said rectilinear axis; and
   means on said jack sleeve for monitoring the proper alignment of said alignment bar along said rectilinear axis.

8. The device of claim 7, wherein said jack sleeve is telescopingly mounted over said standard for slidable movement thereon, and wherein said means for selectively positioning said jack sleeve relative said standard comprises a locking pin.

9. The device of claim 7, further comprising means for biasing said base toward said jack sleeve.

10. The device of claim 9, wherein said biasing means further comprises a spring member.

11. The device of claim 7, wherein said alignment bar is designed to fit within and effectively support said length of conduit or pipe along said rectilinear axis and along substantially the entire length of said conduit or pipe.

12. The device of claim 7, further comprising means for mechanically facilitating the selective positioning of said jack sleeve relative said standard.

13. The device of claim 12, wherein said means for mechanically facilitating further comprises a fluid powered cylinder.

14. The device of claim 7, further comprising means for attaching said alignment bar to said jack sleeve at one of a plurality of predetermined, substantially perpendicular orientations, to enable the provision of a limited preset angle of inclination to said alignment bar relative to the horizontal for supporting conduit and pipe to be aligned.

15. A device for aligning a length of conduit or pipe along a predetermined rectilinear axis and for supporting such aligned length of conduit or pipe during backfilling procedures, said device comprising:
   a base member;
   an upstanding standard attached at its lower end to said base member, and extending upwardly therefrom;
   an elongated jack sleeve having upper and lower ends and telescopingly arranged with said standard such that said jack sleeve can be adjustably positioned relative said standard;
   means for locking said jack sleeve in a particular position relative said standard;
   an alignment bar attached adjacent the lower end of said jack sleeve and extending outwardly therefrom, said alignment bar having a length approximately equal to said length of conduit or pipe to be aligned, and designed to align and internally support said length of conduit or pipe along said rectilinear axis; and
   means located adjacent the upper end of said jack sleeve for monitoring the proper alignment of said alignment bar along said rectilinear axis.

16. The device of claim 15, wherein said means for locking comprises a removable locking pin.

17. The device of claim 15, further comprising means for adjustably attaching said alignment bar to said jack sleeve such that said bar can extend outwardly from said jack sleeve at one of a plurality of preset angles of inclination relative to the horizontal for supporting conduit and pipe.

18. The device of claim 15, wherein said alignment bar is hingedly attached to said jack sleeve to enable said alignment bar to be folded into substantially parallel relationship with said jack sleeve for storage and transportation.

19. A method for aligning and laying conduit or pipe to be at least partially buried or backfilled along a predetermined rectilinear line or pipe line, said method comprising the following steps:
(a) inserting the alignment bar portion of an alignment device into a conduit or pipe to be aligned and set, said alignment bar having a length substantially equal to the length of said conduit or pipe and being attached to a vertically adjustable jack sleeve;
(b) aligning the distal end of the length of conduit or pipe mounted on said alignment bar with said predetermined rectilinear axis or pipe line and a previously aligned and layed length of pipe if applicable;
(c) vertically orienting the alignment device;
(d) adjusting the vertical position of the conduit or pipe located on said alignment bar in accordance with said predetermined rectilinear line by adjusting the vertical position of said jack sleeve;
(e) supporting the now aligned conduit or pipe in position during backfilling operations around at least a substantial portion thereof; and
(f) withdrawing said alignment bar and aligning device from the now aligned and at least partially backfilled length of conduit or pipe.

20. The method of claim 19, further comprising repeating the steps (a)-(f) for a subsequent length of conduit or pipe.

21. The method of claim 19, wherein the steps of vertically orienting the alignment device and adjusting the vertical position of the conduit or pipe are monitored and checked in conjunction with optical surveying equipment.

22. A device for aligning and preliminarily supporting hollow conduit and pipe along a predetermined rectilinear axis, said device comprising:
a base;
a standard attached adjacent its lower end to said base and extending upwardly therefrom;
a jack sleeve adjustably mounted relative said standard;
means for selectively adjusting the position of said jack sleeve relative said standard as desired;
an alignment bar attached to said jack sleeve and extending outwardly therefrom to support a length of conduit or pipe to be aligned along said rectilinear axis;
means for monitoring the proper alignment of said alignment bar along said rectilinear axis; and
means for normally biasing said base toward said jack sleeve to facilitate removal of said device from a previously aligned section of pipe.

23. The device of claim 22, wherein said biasing means comprises at least one spring member.

24. A device for aligning and preliminarily supporting hollow conduit an pipe along a predetermined rectilinear axis, said device comprising:
a base;
a standard attached adjacent its lower end to said base and extending upwardly therefrom;
a jack sleeve adjustably mounted relative said standard;
means for selectively adjusting the position of said jack sleeve relative said standard, as desired;
an alignment bar attached to said jack sleeve and extending outwardly therefrom to support a length of conduit or pipe to be aligned along said rectilinear axis; and
means for monitoring the proper alignment of said alignment bar along said rectilinear axis, said means for monitoring comprising a scale for use with optical alignment equipment.

25. A device for aligning and preliminarily supporting hollow conduit and pipe along a predetermined rectilinear axis, said device comprising:
a base;
a standard attached adjacent its lower end to said base and extending upwardly therefrom;
a jack sleeve adjustably mounted relative said standard;
means for selectively adjusting the position of said jack sleeve relative said standard, as desired;
an alignment bar attached to said jack sleeve and extending outwardly therefrom to support a length of conduit or pipe to be aligned along said rectilinear axis; and
means for monitoring the proper alignment of said alignment bar along said rectilinear axis, said means for monitoring comprising a target device to receive an alignment laser beam.

* * * * *